April 29, 1958 W. F. KNAUERT 2,832,842
BODY CONTACTING INERTIA REACTION ELECTROMECHANICAL
TRANSDUCING DEVICES
Filed July 17, 1952 5 Sheets-Sheet 1

INVENTOR.
W. F. KNAUERT
BY
Greene, Pineles, & Durr
ATTORNEYS

INVENTOR.
W. F. KNAUERT
BY
ATTORNEYS

April 29, 1958 W. F. KNAUERT 2,832,842
BODY CONTACTING INERTIA REACTION ELECTROMECHANICAL
TRANSDUCING DEVICES
Filed July 17, 1952 5 Sheets-Sheet 5

INVENTOR.
W. F. KNAUERT
BY
Greene, Pinelas, & Durr
ATTORNEYS

United States Patent Office 2,832,842
Patented Apr. 29, 1958

2,832,842

BODY CONTACTING INERTIA REACTION ELECTROMECHANICAL TRANSDUCING DEVICES

William F. Knauert, Yonkers, N. Y., assignor to Sonotone Corporation, Elmsford, N. Y., a corporation of New York Application July 17, 1952, Serial No. 299,473

9 Claims. (Cl. 179—107)

This invention relates to electromechanical transducing devices of the inertia reaction type and particularly to hearing aid bone conduction receivers which are worn on the head of the user for inducing hearing by bone conduction, and also to throat microphones of the inertia reaction type.

In inertia reaction bone conduction receivers, as described, for instance, in Greibach Patent Re. 21,030, a vibratory contact mass portion, usually in the form of a completely closed casing which is held coupled to the body of the user in the region of the hearing inducing bones thereof, is connected through resilient or compliant link elements to an additional interiorly disposed mass portion that is carried in a vibratory condition by the contact portion and constitutes therewith an electromechanical transducer structure. When in use, electric speech frequency energy impressed on the transducer structure produces a corresponding vibratory motion between its mass portions for transmitting hearing inducing vibratory inertia-reaction forces through the contact wall of the casing to the bones of the user. When such inertia reaction device is used as a throat microphone, the vibratory throat motion acting on its contact wall causes the transducer structure to generate output voltages which enable intelligible reproduction of speech.

Among the objects of the invention is a novel inertia-reaction bone conduction receiver of the foregoing type which operates efficiently over the principal speech frequency range and which is effective in suppressing disturbing distortion at higher frequencies and which also eliminates the difficulties heretofore encountered with such receivers.

Among the objects of the invention are also various novel constructional features which greatly simplify the manufacture of highly efficient tiny bone conduction receivers and throat microphones of the foregoing type on a large scale production basis.

The foregoing and other objects of the invention will be best understood from the following description of exemplifications thereof, reference being had to the accompanying drawings, wherein

Fig. 1–A is a diagrammatic view of a typical bone conduction hearing aid;

Fig. 1–B is a diagrammatic view showing, partially in cross-section, an artificial mastoid useful in performing objective tests, and obtaining response curves of bone conduction receivers;

Figs. 2–A and 2–B are analogous electric circuit systems, the constants of which represent the electromechanical elements of two forms of bone conduction receivers of the invention;

Fig. 3–A is a set of frequency response curves of representative bone conduction receivers of the invention in comparison with those of prior art bone conduction receivers;

Fig. 3–B is a set of frequency response curves of different representative bone conduction receivers of the invention;

Figs. 4–A and 5–A are views similar to Figs. 4 and 5, respectively, showing for comparison, the structure of the most efficient prior art bone conduction receiver;

Bone conduction receivers of the present invention are designed for operation as part of a wearable hearing aid small enough for inconspicuous wear on the body of the user. However, it should be understood that bone conduction receivers of the invention are also highly effective as throat microphones for transducing the speech vibrations of the throat into an electric output which enables intelligible reproduction of speech.

Fig. 1–A shows diagrammatically the general arrangement of the principal elements of a bone conduction hearing aid. It comprises a microphone 11 which picks up the sound propagated in the air and delivers a corresponding electric signal output to an amplifier 12. The electric output of the amplifier 12 is impressed on the electromechanical vibratory transducer structure of a bone conduction receiver 10 which is usually held coupled to the mastoid bone behind the ear of the user, although it may be held coupled to some other part of the hearing inducing body bones of the hard-of-hearing person using the hearing aid. The microphone 11 is generally combined with the amplifier 12 and housed in a common flat casing small enough for inconspicuous wear on the body of the user, for instance, hidden in the vest pocket or the like.

The bone conduction receiver 10 is held coupled with its casing contact wall 31 against the hearing inducing bones of the user either by a head band, or for users with mild hearing impairment, by a layer of cement uniting or holding coupled the contact wall of the receiver 10 to the flesh overlying the hearing inducing bones of the user.

Figure 3A:
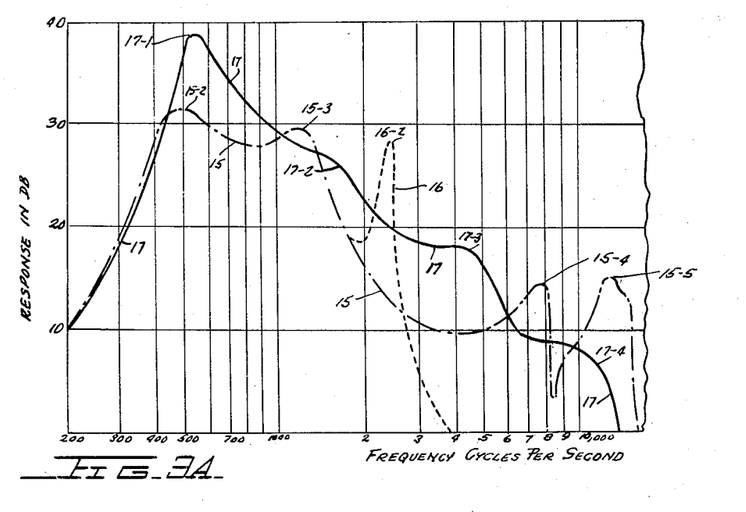

The best generally used prior art hearing aid bone conduction receivers, when held coupled to the bones of the user, operated with a response shown in Fig. 3-A by the dash line response curve 15. This response curve 15 shows that the output of the receiver has response peak 15-2 at about 450 cycles per second (C. P. S.) and another response peak 15-3 at about 1000 C. P. S., the response of the receiver drooping for frequencies rising above 1500 C. P. S. and having a series of peaks 15-4 and 15-5 in the high frequency range above 6000 C. P. S. The hearing aid amplifiers 12 generally designed to amplify with good quality over the principal part of the speech frequency range up to about 3500 to 4000 C. P. S., have, in most cases, an output which contains high frequency distortion components in the range of the high frequency response peaks of such prior art bone conduction receivers, such as peaks 15-4 15-5 of curve 15 (Fig. 3-A). Since in prior art bone conduction receivers the entire receiver casing vibrates with such undesirable high frequency peaks, they reproduce the very objectionable distortion components of the amplifier for frequencies corresponding to the high frequency response peaks of such receivers, such as peaks 15-4, 15-5 of curve 15 (Fig. 3-A).

In the past, attempts have been made to overcome the foregoing difficulties by designing the internal electromechanical transducer structure of such bone conduction receivers as a band pass filter of relatively complicated mechanical construction arranged to cut off or attenuate the receiver response above 3000 C. P. S. Hawley Patent No. 2,202,906 assigned to Bell Telephone Laboratories, describes such prior art band-pass filter bone conduction receiver in the form in which it was manufactured and sold by the Western Electric Company as a part of its bone conduction hearing aids. In Fig. 3-A, the peaked dot-line curve 16 shows in conjunction with the adjoining left hand part of the dash-line curve 15 a representative response curve of such Western Electric filter-type bone conduction receiver embodying the construction shown in the Hawley patent. This bone conduction receiver is effective in cutting off the high frequencies above 3000 C. P. S. and its response has an additional high frequency peak 16-2 at about 2300 C. P. S. (Fig. 3-A). Greibach Patent 2,500,541 discloses another form of prior bone conduction receiver having an internal band-pass filter structure of the general type shown in the Hawley patent. However, in such prior band-pass filter type receivers, the entire receiver casing vibrates with such peaked high frequency response. These high frequency peaked vibrations of the casing are fed back acoustically to the hearing aid microphone 11 thereby setting up the continuous oscillations and whistling at such peaked frequencies, thereby rendering the hearing aid practically useless. Such acoustic feed back took place despite the damping effect of the skin or flesh against which the receiver casing was held coupled, because the damping effect of the flesh was too small for effectively damping such high frequency response peak vibrations of the relatively large mass of the entire casing structure.

In order to avoid and eliminate such acoustic feedback oscillations and whistling, the high frequency gain of the hearing aid amplifiers 12 used with such prior art filter-type bone conduction receivers, had to be reduced in order to keep the acoustic feed-back of the receiver casing to the microphone 11 below the level at which acoustic feed back oscillations are set up at such high frequency response peaks.

The present invention is based on the discovery that the simple prior art inertia reaction bone conduction receiver, without additional internal band-pass filter structures, will operate as a band-pass filter which eliminates all the foregoing heretofore encountered difficulties, if the bone contacting casing wall 31 thereof—other than the casing structure carrying and forming part of its electromechanical vibrating system — is arranged to vibrate relatively to such other casing structure with a fundamental vibratory mode in the range between about 2500 to 5000 C. P. S., and, at most, in the range between about 2000 to 6000 C. P. S.

One phase of the present invention is based on the discovery that by designing such bone conduction receiver of the invention—which has a contact wall that vibrates relatively to the main casing structure and its vibratory system with a fundamental mode between about 2000 to 6000 C. P. S.—so that its overall mass is at most about 12 grams and that its lowest or first vibrating mode falls within the same frequency range as in the prior art receivers, the response level of such receiver of the invention will be materially raised in the high frequency range above its second resonant mode, while securing the same high response level in the low frequency range as obtainable in the best prior receivers having an overall mass of 16 to 17 grams.

In the bone conduction receiver of the invention, the relatively light and small casing contact wall—which is designed to vibrate with a relatively high-frequency fundamental mode relatively to the main casing structure and its internal electromechanical vibrating unit— vibrates with a relatively large amplitude over the frequency range of its high mode. Because of its small mass and its close intimate coupling with the flesh of the body, its large amplitude high-mode vibrations are effectively damped by the flesh and any resonant peaks of its high-mode vibrations are effectively suppressed.

In the bone conduction receiver of the invention, the relatively small and light casing contact wall—through which it is held coupled to the flesh overlying the hearing inducing bones—vibrates with a relatively large amplitude over the frequency range between about 2000 to 6000 C. P. S. between the compliance of the flesh and the compliant elements through which the contact wall is connected to the relatively large adjoining main casing structure and the assoiacted elements of the electromechanical transducer structure carried thereby.

The complaint connection of the relatively small mass of the contact wall isolates or decouples its vibrations from the relatively large adjoining casing structure, thus eliminating the disturbing feed-back of the higher mode vibration peaks present in prior band-pass filter bone conduction receivers of inertia reaction type. Because of this decoupling of the relatively large amplitude high-mode vibrations of the control wall 31, the relatively large casing walls will vibrate with only a relatively small amplitude over this high mode frequency range, thereby keeping the acoustic coupling of the casing in this high frequency range below the disturbing level at which feed-back oscillations are set up.

In other words, only a fraction of the actual mass of the bone conduction receiver of the invention, to wit, only the relatively small mass of the contact wall 31 resonates at the desired high frequency corresponding to the fundamental mode thereof and this contact wall mass is low enough to insure that the inherent energy dissipation of the flesh of the body to which it is coupled shall damp out and suppress any vibration peaks in its high mode response vibrations.

In addition, the compliant elements interposed between the contact wall and the adjoining main casing structure of the bone conduction receiver of the invention, make it possible to provide a very close match between the impedance of the receiver and the mastoid body to which it is coupled.

In hearing aids it is very desirable to provide for a high response level over the medium frequency range of 1500 to about 5000 C. P. S. which is very important for intelligible reproduction of speech. On the other hand, in the frequency range above 5000 to 6000 C. P. S. it is not important for intelligible reproduction of speech. In accordance with a further phase of the invention, the hearing aid amplifier which supplies the amplified microphone output to the bone conduction receivers of the invention is so designed as to roll off or cut the response in the frequency range beyond the high mode of the contact wall and thereby suppress or eliminate harmonic and intermodulation distortion components from the output of the receiver.

Although the invention is applicable to electro-acoustic devices operating with any of the known types of electro-mechanical transducer structures, such as piezoelectric or electrostrictive transducer structures, the principles of the invention will be explained in connection with a practical exemplification thereof, in the form of a bone conduction receiver operating with an electro-magnetical transducer structure and forming part of the hearing aid such as described in connection iwth Fig. 1–A.

Figure 1:
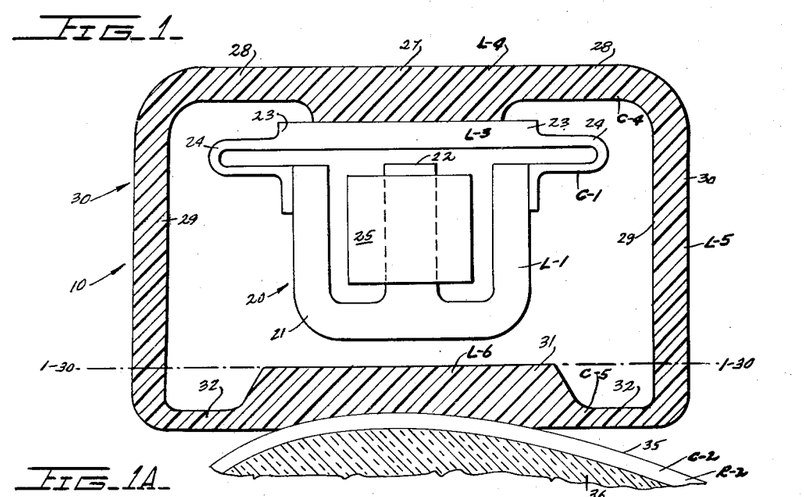
Fig. 1 is a simplified cross-sectional diagrammatic view of the principal elements of one form of a bone conduction receiver of the invention as it is held coupled across the skin or flesh to a portion of the hearing inducing bone body of the user.
Figures 1A, 1B, 2A:
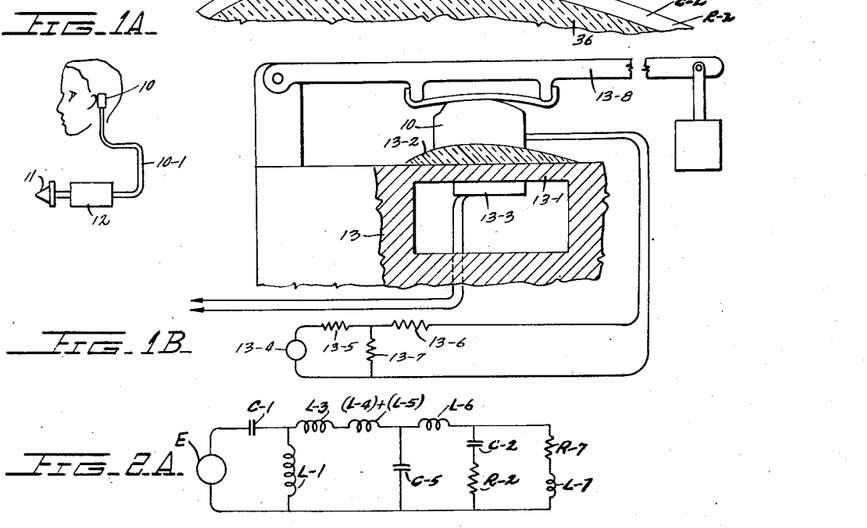

Fig. 1 shows in simplified form the general arrangement of the elements of an electromagnetic bone conduction receiver exemplifying the invention, as it is held coupled across the skin to a portion of the hearing inducing bone structure of the user with the various elements shown exaggerated for the sake of simplicity. The bone conduction receiver comprises an electromagnetic vibrating structure generally designated 20 comprising a generally E-shaped magnet core 21 having a central pole 22 cooperating with a magnetic armature 23 to which it is joined by compliant or resilient spring junction elements 24 into a vibratory system. A coil winding 25 on the central pole core of the E-shaped magnet core 21 is arranged to be supplied with energizing currents of the audio or speech frequency range for producing a corresponding vibratory movement between the core 21 and the armature 23 across the gap 26 separating the pole faces of the magnetic core structure.

The armature 24 of the electromagnetic vibrating structure 20 is shown suitably affixed to a rear or mounting wall 27 of a relatively rigid open-end casing structure 30 having rigid side walls 29 enclosing an interior casing space in which the electromatic vibrating structure 20 is housed. The relatively rigid open-end casing structure 30 is provided at its open end or side with a contact wall 31 which is disposed opposite to the mounting wall 22 and is arranged to be held coupled across the skin or flesh 35 to hearing inducing body bones 36 of the user.

The internal electromechanical vibrating system 20, shown of magnetic core elements 21, 23 with their compliant junction or link elements 24 and the main casing body 30 to which the core armature 23 is affixed, are in general, so designed and proportioned so that when held coupled to the body 36 of the user, it operates with a resonant frequency in the range between about 300 to 700 C. P. S. or in general, below 1000 C. P. S.

In accordance with the invention, the bone contacting wall 31 of the receiver casing 30 is so arranged and proportioned, that when coupled to the body 36 of the user—it shall vibrate with a fundamental mode in the range between about 2500 to 5000 C. P. S., or in general, in the range between about 2000 to 6000 C. P. S.—relatively to the adjoining parts of the open-end casing structure 30 carrying and forming part of the electromechanical transducer structure 20 enclosed within the casing, and that they shall form a band-pass filter which is effective in rolling off the response above 5000 to 6000 C. P. S. and that the contact wall shall be subjected to effective damping of any higher vibratory modes thereof by the engagement of its relatively small mass with the flesh of the user's body.

Since the contact wall 31 of the receiver is connected to the relatively rigid casing 30 through the compliant wall elements 32 for vibration relatively thereto with a fundamental mode between 2500 and 5000 C. P. S., the receiver arrangement of Fig. 1 is essentially a mechanical band-pass filter of the type represented by the electric circuit analog of Fig. 2-A.

In the band-pass filter analog of Fig. 2-A, the different circuit elements represent the following elements of the receiver of Fig. 1:

E is the force acting across the magnetic gap between core pole 22 and the armature 23;

C–1 is the compliance of the spring elements 24 between the core 21 and the armature 23;

L–1 is the mass of the resiliently carried magnet core 21;

L–3 is the mass of the armature 23;

(L–4)+(L–5) is the total mass of the casing rear wall 27 with its casing side wall structure 29;

C–5 is the compliance of the resilient elements 32 which join the contact wall 31 to the casing structure 30;

L–6 is the mass of the contact wall 31;

L–2 and R–2 are the compliance and the internal resistance of the flesh overlying the hearing inducing bone body, and also of the compliant pad 13-2 of the artificial mastoid of Fig. 1–B; and L–7 and R–7 are the large mass of the head body and its internal resistance.

Because of its construction as a specific type of mechanical band-pass filter, such receiver of the invention may readily be designed to operate with response curves of the type shown in Fig. 3–A by solid line curve 17.

Figure 3B:
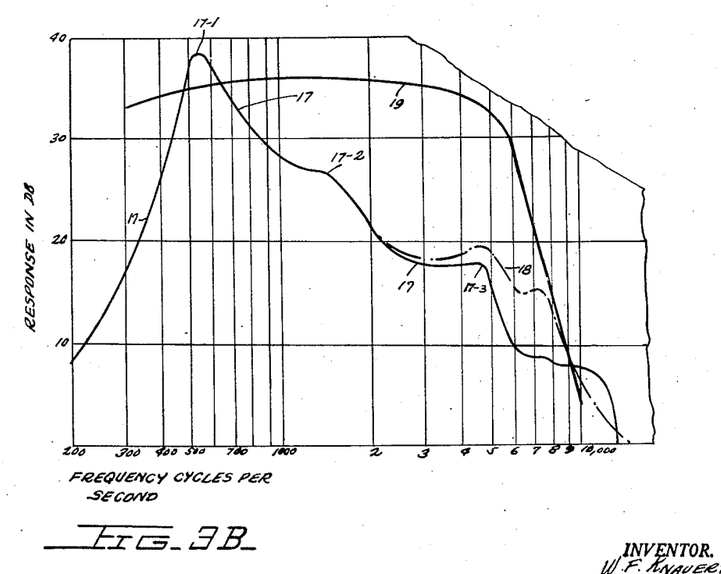

The advantages secured by the principles underlying the bone conduction receiver of the invention will be better understood by explaining their performance as determined by objective tests performed by what is known in the art as an "artificial mastoid." An early form of such artificial mastoid is described in the article of M. S. Hawley, Bell Laboratories Record, vol. 18, 1939, pp. 73–75. A much superior form of an artificial mastoid for testing bone conduction receivers is described in the article of Carlisle and Pearson "A strain-gauge type artificial mastoid," published in The Journal of the Acoustical Society of America, vol. 23, pp. 300–302, May 1951. Fig. 1–B shows diagrammatically, an artificial mastoid testing equipment of the type described in the last-named article and which was used in obtaining the response curves of bone conduction receivers shown in Figs. 3–A and 3–B.

Referring to Fig. 1–B, the artificial mastoid comprises a solid heavy block 13 of metal provided along one border with an integral stiff test bar 13–1 which resonates at a high frequency considerably above the speech frequency range, such as 17,000 C. P. S. and the bone receiver 10 is held coupled to the test bar 13–1 across a pad 13–2 of elastomer material. A piezoelectric transducer 13–3, such as disclosed in application Serial No. 727,152, filed February 7, 1947, is soldered with one of its outer flat surface electrodes to the inner surface of the test bar 13–1 for translating vibratory forces imparted thereto by the bone receiver 10 into a corresponding electric output which is delivered through a pair of supply conductor leads 13–4 to a conventional oscilloscope not shown. A standard audio-frequency oscillator 13–4 is connected through an impedance matching network including resistor elements 13–5, 13–6, 13–7 to the energizing coil of the bone conduction receiver 10. The receiver 10 is held pressed against the pad 13–2 by a pivotally mounted lever 39 which is weighted and arranged to exert a pressure force of substantially the same magnitude as applied by the conventional spring head band used for holding such receiver coupled to the body of the user.

Extensive texts have established that when using an elastomer pad 13–2 of the characteristics representative of the flesh overlying the mastoid (centimeter per dyne), an artificial mastoid of the type described above will give objective test results which represent correctly the performance of a bone conduction receiver used by a person of average normal hearing.

By way of example, good test results are obtained with an elastomer pad 13–2 having the following characteristics. The elastomer pad 13–2 had at its central spervidal region a thickness of 0.125 inch, its spheroidal upper surface had a radius of about .800 inch and its lower flat circular surface had a diameter of about 1 inch. It was made of a flexible elastomer material consisting of a vinyl halide polymer, known commercially as Koroseal molding compound No. 215 manufactured by B. F. Goodrich Co. and the resulting pad 13-2 of the foregoing dimensions had a compliance in the range from ½ to 2 times $10^{-8}$ cm./dyne (centimeter per dyne).

Figs. 3-A, 3-B show response curves of bone conduction receivers obtained with such artificial mastoid in decibels above an arbitrary zero level shown as the horizontal abscissa axis. Such zero reference base is very useful in comparing the different bone conduction receivers and the vertical ordinates above the horizontal zero axis represent the response level or the level of the vibratory forces imparted by the receiver 10 to the artificial mastoid at the different frequencies indicated on the horizontal base line. Such response curves may approximately be related to average hearing characteristics of a normal person by comparing the average loudness of a tested receiver at 1000 C. P. S. with that at 10,000 C. P. S. and drawing a sloped base line through points of equal loudness at these two frequencies.

As stated before, in accordance with the invention, the bone contacting casing wall 31 of the bone conduction receiver of the invention is so proportioned and arranged relatively to the other parts of the casing structure forming part of the electromechanical transducing structure, that the contact wall 31 shall vibrate relatively to the main casing wall structure 30 with a fundamental mode in the range between about 2500 to 5000 C. P. S., or, in general, in the range between about 2000 to 6000 C. P. S.

In the form of bone conduction receiver shown in Fig. 1, the desired vibratory mode characteristics are given to the body contacting contact wall 31 by interposing resilient or compliant link elements or region 32 between its central wall portion and the adjoining border wall region through which it is joined to the relatively rigid side walls 29 of the casing structure 30 so as to secure vibration of the contact wall 31 or its central wall portion to vibrate with a fundamental mode in the range between about 2500 and 5000 C. P. S. relatively to the adjoining substantially rigid casing structure 30 surrounding the interior casing space.

In such bone conduction receiver of the invention, the parts which form the several mesh elements of its mechanical band-pass filter shown in Fig. 2-A, may be readily designed to give such receiver a response shown in Fig. 3-A by the solid line curve 17. This curve 17 shows the response of a representative bone conduction receiver of the invention having a contact wall 31 which vibrates relatively to adjoining casing wall 30 of the receiver with a fundamental vibratory mode of about 4500 C. P. S. when the receiver is held coupled to the artificial mastoid or to the body of the user. In this connection, it should be understood that all response curves shown in Figs. 3-A, 3-B, have been obtained with the contact wall 20 of the receiver held coupled to the artificial mastoid, as described above.

It will be seen from curve 15 of Fig. 3-A, that the response of such receiver of the invention does not have any peaked high frequency responses, such as peak 16-2 of curve 16 of the prior art band-pass filter receivers. As a result, the casing vibrations of such receiver thereof do not cause any acoustic feed-back to the microphone of a level sufficient to set up sustained oscillations and whistling, a disturbing factor which made it necessary to design the practical prior art filter-type receivers with a high frequency mode below 3000 C. P. S. and to limit the high frequency gain of the amplifier so as to keep acoustic feed-back of the peaked higher mode vibrations of the casing below the level at which oscillations and whistling are not set up.

Bone conduction receivers of the invention may also be designed to introduce into its mechanical band-pass filter system an additional mesh by interposing compliant wall link elements 28 between the rigid rear wall portion 27 and the rigid side wall structure 29 of the casing 30.

Figure 2B:
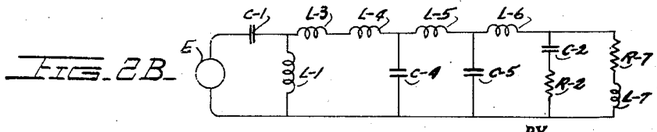

Fig. 2-B is analog of the mechanical band-pass filter formed by receiver provided with such resilient casing wall link elements 28. In this analog, the mass L-5 of the casing side walls 29 forms with the compliance C-5 of the rear wall link elements 28 a separate filter mesh which provides for the control of the response in the frequency range between about 7000 C. P. S. and the high cut-off frequency.

In the response curves, such as shown in Figs. 3-A, 3-B, the desirable vibratory mode of the contact wall 31 relatively to the casing structure 30 is indicated by curve portion 17-3 corresponding to the resonant peak of the vibratory mode of the contact wall. By proper choice of the shape and material of the contact wall 31, the parameters L-6 and C-5 of the corresponding meshes of the corresponding electric analog may be readily controlled for securing the desired vibratory mode thereof.

The basic principle underlying the inertia-type bone conduction receiver of the invention described above, to wit, arranging for the contact wall of the receiver casing to vibrate with a fundamental mode between about 2500 to 5000 C. P. S. relatively to the adjoining main receiver casing structure make it possible to provide bone conduction receivers operating with a much better response than the best prior art bone conduction receivers while eliminating the various difficulties encountered with a prior art bone conduction receiver including the acoustic feedback and sustained oscillations.

An outstanding feature of the invention is the fact that for full effectiveness, it is desirable to construct them with an overall mass that is only about half of the mass heretofore believed to be required for the operation of the best and smallest prior art bone conduction receivers.

The reduced mass of the receiver makes it more effective in transmitting the bones hearing inducing vibrations in the range between 1500 to 6000 C. P. S., thereby materially raising the response of the receiver in this frequency range which is very important for intelligible reproduction of speech. In addition, this reduction of the mass and size of the receiver of the invention renders them more comfortable in use and less conspicuous when worn on the body of the user, a factor of critical significance for a hearing aid.

Figs. 4, 5 and 6 to 10 inclusive, show one practical form of a novel bone conduction receiver based on the principles of the invention described above. It comprises a relatively rigid casing structure 40 housing the internal elements of an electromechanical vibrating mechanism generally designated 50.

Figure 4:
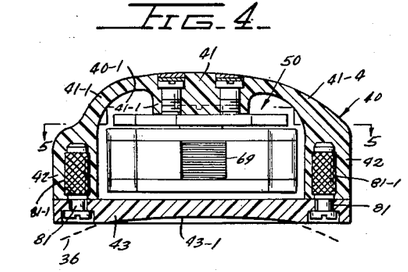
Fig. 4 is a vertical cross-sectional view of one form of a practical bone conduction receiver based on the principles of the invention.
Figure 5:
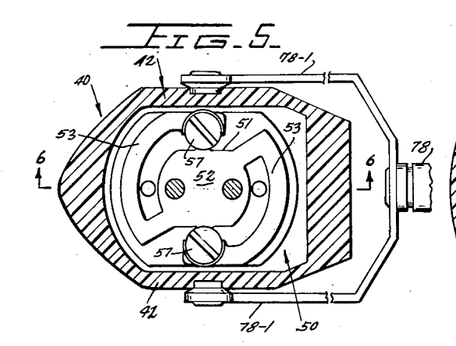
Fig. 5 is a cross-sectional view along lines 5—5 of Fig. 4.
Figure 6:
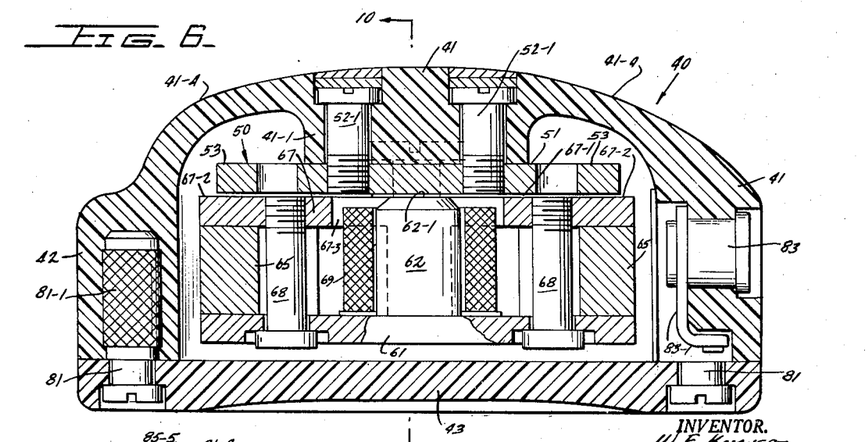
Fig. 6 is a cross-sectional view, along lines 6—6 of Fig. 5, of the same bone conduction receiver of the invention.

In the form shown, the relatively rigid open-end casing structure 40 is formed of a rear wall 41 and rigid side walls 42 surrounding the interior casing space 40-1. The casing 40 has an opening at its frontal side facing the body 36 of the user, the casing opening being enclosed by a detachable contact wall 43. In the form shown, the rigid casing side walls 42 have at their open sides a flat seating face along which the similar flat border face of the contact wall 43 is seated. The casing contact wall 42 has an external generally spherical or spheroidal concave coupling surface 43-1 arranged and shaped to fit, engage and establish intimate coupling with the skin or flesh overlying the hearing inducing bone structure 36 of the body of the user, such as the mastoid eminence behind the ear of a person using the hearing aid.

The casing rear wall 41 which extends opposite to its detachable contact wall 42 is provided with a central or inner relatively thick mounting wall portion 41-1 which has mounted thereon or carries the associated elements of the internal vibrating mechanism 50 with which it forms an electromechanical transducer structure.

Although it may be of any other type, the internal vibrating mechanism 50 shown is of the electromagnetic type and comprises a magnetic armature 51 having a portion affixed to the rear casing wall 41 and carrying in a vibrating condition an electromagnetic core structure generally designated 60. The magnetic core structure 60 comprises an oblong magnetic yoke or junction plate 61 provided at its center with a cylindrical magnetic core pole piece 62 which is suitably secured thereto as by electric spot welding or by a rivet connection or by both such connections. Two permanent magnet core blocks 65 are held clamped to the opposite end regions of the oblong yoke plate 61, by an oblong magnetic pole plate 67. Suitable clamping connections, such as two screws 68 having heads engaging the yoke plate 61 and threaded end portions engaging the pole plate 67 hold the pole plate 67 clamped to the yoke plate 61.

The central core pole 62 of the electromagnetic core 60 is surrounded by coil windings 69 which are interlinked with the magnetic flux threading through the core pole 62 and across its gap spacing to the central portion of the armature 51 and then returning through the outer region 67-2 of the pole plate 67 by way of parallel path through the opposite permanent magnetic core blocks 65 and the yoke plate 61 back to the central core pole 62.

The pole plate 67 is provided with a central opening through which the free end of the core pole 62 projects, the pole plate opening providing a non-magnetic or air gap 67-3 separating the pole face region 62-1 of the central core pole 62 from the surrounding coplanar pole face of the pole plate 67. Except for the permanent magnet core block 65, the armature 51 and all other magnetic elements 61, 62 and 67 of the resiliently electromagnetic vibrating mechanism 50 are of highly permeable magnetic material of minimized or negligible magnetic coercive force or retentivity.

Figure 11:
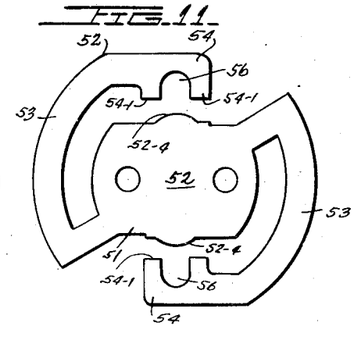
Fig. 11 is a plan view of the magnetic armature of the bone conduction receiver of Figs. 4, 5 and 6 to 10.

In the form shown (Figs. 5, 11), the armature 51 has a relatively rigid central oblong main armature portion 52 which serves as its mounting portion and is affixed to the adjacent inward face of the inner casing rear wall portion 41-1. The armature 51 shown has two resilient arms 53 extending from diagonally opposite corner portions of the main armature portion 52, and having at their ends mounting or junction portions 54 which are suitably affixed to adjacent facing portions of the electromagnetic core structure 60, so as to maintain the pole faces 62-1, 67-1 of the core pole 62 and the pole plate 67 spaced by a small gap of the order of .001 inch from the facing pole surface of the central armature portion 52. In the form shown, the main central armature portion 52 of the armature 51 is secured to the adjacent inner face of the mounting casing 43 by two screws 52-1 having heads seated in recesses formed in the outer wall surface of the casing rear wall 41.

In accordance with a phase of the invention disclosed herein, the mounting elements of the armature 51 through which it is connected to the resiliently carried electromagnetic core structure 60 are so arranged and shaped as to provide operative junction connections therebetween and also to provide stop elements for limiting the maximum vibratory excursions between the armature 51 and the resiliently carried electromagnetic core structure 60 and thereby prevent deformation of the armature beyond its elastic limit caused by a sudden impact or acceleration imparted to the relatively heavy resiliently carried magnetic structure 60, for instance, when the entire receiver is accidentally dropped on the floor.

In the form of the invention shown (Figs. 5 and 7 to 11), the end portions 54 of the two compliant arms 53 of the armature 51 constitute the mounting portions thereof which are affixed to the adjacent facing portions of the electromagnetic core structure 60. In the form shown, the mounting end portions 54 of the two resilient armature arms 53 are arranged to terminate immediately adjacent the opposite central side surface portions of the main oblong armature portion 52 of the armature 51. Furthermore, the two mounting end portions 54 of the two armature arms 53 are provided with generally radial inward mounting extensions 55 provided with a screw seating opening or recess 56 which is sufficiently close to the adjacent armature portion 52 so as to seat therein the shank of a screw 57 the head of which serves both to clamp the mounting end portions 54 of the respective armature arms 53 to the adjacent core pole plate 67 and also to limit the vibratory excursions of the core 60 relatively to the armature 51.

The main armature 52 is made of highly permeable magnetic sheet material and the form shown in Figs. 4 to 11, the armature 52 and its junction arms 53 form an integral armature structure 51 of the same thickness.

To provide for the proper small gap spacing between the pole face of the main armature portion 52 and the facing pole faces 62-1, 67-1 of the electromagnetic core structure 60, the mounting end portions 54 of the armature are clampingly affixed by the clamping screws 57 to the facing portions of the pole plate 67 across interposed spacer shims or spacer washer elements.

As explained above, the heads of the two armature junction screws 57 are arranged to serve also as stops which limit movement of the core 60 relatively to the main armature portion 52. This is achieved by also placing between the inward face of the head of each clamping screw 57 a spacer shim or washer elements arranged to assure that a peripheral region of the head of the respective screw 57 which overlies the adjacent armature portion 52 is spaced therefrom by a small gap and operates as a stop against vibratory movement exceeding the shim thickness or the gap provided thereby. In other words, spacer shims are placed under as well as over the armature arm junction portions 54 which are affixed by screws 57 to the pole plate.

Figure 12:
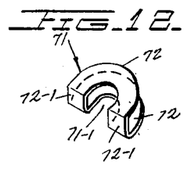
Fig. 12 is a perspective view of the spacer washer.

According to the invention, the two spacer elements underlying and overlying the mounting portion 54 of each armature junction arm 53 are formed by two sections of an integral U-shaped spacer member 71 shown in detail in Fig. 12. In the form shown, the spacer member 71 is formed of a generally oblong sheet member of suitable metal, such as copper or a copper alloy, having an elongated opening 71-1 therein. The spacer sheet member 71 is folded along two spaced fold lines into a U-shaped structure having two arcuate spacer arms 72 extending from the transverse fold link 71-2 thereof.

Furthermore, each armature arm junction portion 54 is so shaped that its screw seating opening 56 constitutes only a recess confined between two junction ears 54-1 thereof which project close to the adjacent side edge of the main armature 52, and are clamped by the head of the junction screw 57 to the pole plate 67. In addition, the adjacent side edge of the main armature 52 is provided with an armature ear 52-4 projecting toward the screw seating opening or recess 56 so as to be overlapped by the peripheral region of the head of the junction screw 57 which clamps the junction arm ears 54-1 to the pole plate.

A folded shim spacer structure 71 is placed with its two arcuate spacer arms 72 on the opposite sides of each armature arm junction portion 54 which is clamped by a screw 57 to the pole plate 67. The U-shaped spacer 71 is so arranged that the transverse fold link 71-2 of the U-shaped spacer is seated against the end faces of the projecting junction ears 54-1 of each armature arm junction end 54 which is engaged by the head of the clamping screw 57 with which it is clamped to the pole plate 67 of the resiliently carried core 60. With this arrangement, the inwardly facing surface of the head of each clamping screw 57 overlies along a substantial arcuate region thereof the outwardly projecting stop ear 52-4 of the main armature 52 at a small gap spacing therefrom, thus serving as a positive stop against further movement of the resiliently carried main magnetic core structure 60 in a direction away from the main armature 52.

Figures 7, 8:
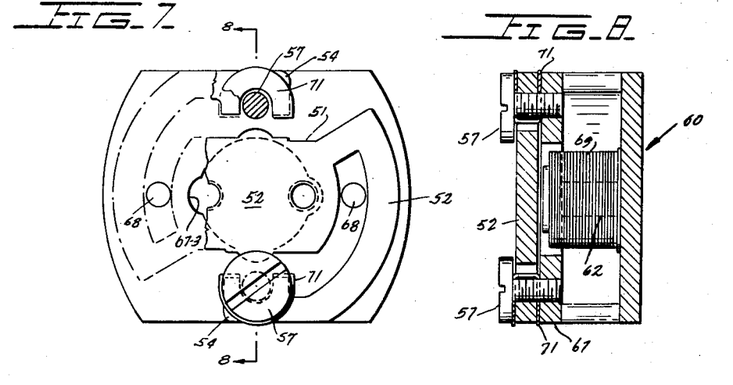
Fig. 7 is a plan view of the electromagnetic structure of the same bone conduction receiver, along lines 5—5 of Fig. 4.
Fig. 8 is a cross-sectional view of the same electromagnetic structure, along lines 8—8 of Fig. 7.
Figure 9:
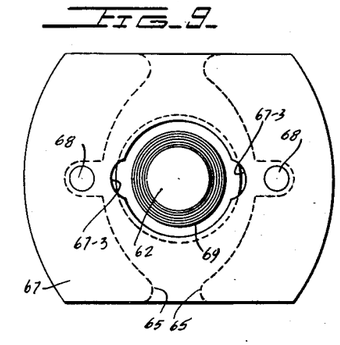
Fig. 9 is a plan view of the driving part of the electromagnetic structure of the same bone conduction receiver, without the armature.
Figure 10:
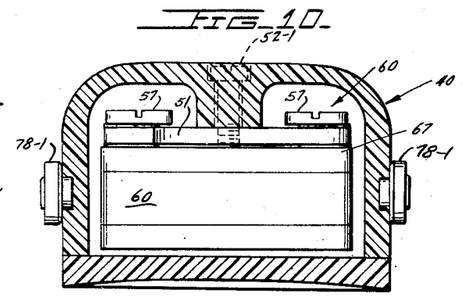
Fig. 10 is a cross-sectional view of the same bone conduction receiver, along lines 10—10 of Fig. 6.

Referring to Figs. 6, 7, 9, the generally circular gap region 67–3 separating the pole end of the core pole 62 from the adjoining pole plate 67 is enlarged at diametrically opposite regions 67–3 to permit free entry of the inner shank ends of excessively long fastening screws 52–1 with which the central main armature portion 52 is affixed to the rear wall mounting portion 41–1. This arrangement simplifies the fool-proof assembly of the mechanism and assures that the vibratory movement of the resiliently carried core structure 60 relatively to the armature 51 is not disturbed by inaccuracies in assembling the mechanism.

As explained above, in accordance with the basic principles of the invention, the contact wall 43 of the casing structure—other than the relatively rigid main hollow casing structure 40 carrying in its interior the associated elements of the electromechanical vibrating system—is arranged to vibrate relatively to the hollow main casing structure 40 with a fundamental vibratory mode in the range between about 2500 to 5000 C. P. S., or in general, in the range between 2000 to 6000 C. P. S.

In the practical form of bone conduction receiver shown in Figs. 4, 5, and 6 to 10, the detachable contact wall 43 is formed of such material and is so shaped and arranged and so secured to the adjoining portions of the hollow casing structure 40 as to cause the contact wall 42 to vibrate with a fundamental mode in the frequency range between about 2500 to 5000 C. P. S. when coupled to the hearing inducing bony body part of the user, or to an artificial mastoid such as described in connection with Fig. 2-B.

One of the shorter side walls 29 of the main hollow casing 40 (Fig. 6) has also mounted therein a pair of terminal sleeves 83 arranged to detachably receive and retain a pair of terminal end plugs of the cord leads 10–1 through which the coil windings 69 of the electromagnetic core structure 60 are connected to the amplifier 12.

The terminal bushings 83 may be of any of the known type, for instance, of a type disclosed in Carlisle et al. Patent 2,339,146, being retained in the operative position by a split leaf spring 83–1 to which the respective terminal leads of the coil 69 are connected, as by soldering.

The bone conduction receiver of Figs. 4, 5 and 6 to 10 may be worn on the head in a conventional way, as by means of a conventional head band 78 (Figs. 5, 10) seated on and engaging the head of the user and provided at one end with a yoke having two yoke arms 78–1 having inwardly projecting pivot pins seated in circular pivot recesses formed in the side walls 29 near the center region of the casing 40.

The main hollow casing structure 40 is oblong shape and formed of molded synthetic resin or in general, of molded solid plastic material. The detachable contact wall 43 shown is likewise of oblong shape and likewise made of molded plastic material. The contact wall 43 is shown attached by screws 81 at its opposite shorter border regions to the flat border faces of the opposite shorter side walls 42 of the casing structure 40. The molded shorter casing side walls 42 have embedded therein metallic bushing sleeves 81–1 (Fig. 6) with internally threaded holes shaped for clamping engagement with the threaded shanks of the clamping screws 81 of the detachable casing contact wall 43.

The heads of the two fastening screws 81 are seated in depressed seating recesses formed in the outer surface of the border portions of the contact wall 43 engaged thereby.

The contact wall 43 of a bone conduction receiver of the type described above may be readily constructed in accordance with the principles of the invention so as to vibrate relatively to the hollow receiver casing 40 with a vibratory mode in the frequency range between 2500 to 5000 C. P. S. or in general, between 2000 to 6000 C. P. S. This vibratory mode of the contact wall 43 of the receiver casing and its resonant frequency may be controlled in a variety of alternative ways or a combination thereof. It may be controlled and determined by the choice of the shape, size and thickness of the contact wall, by reducing the thickness of the contact wall along a groove separating the periphery of the contact wall from the inner or central region thereof, by using for the contact wall material of a selected modulus of elasticity, and/or by controlling the tightness and/or character of the fastening or junction means by which the contact wall is secured to the adjoining main hollow casing structure of the receiver.

By way of example, the contact wall may be of oblong shape as shown in Figs. 4 to 6 with lateral dimensions of about 1.3 x 0.7 inch, a wall thickness in the middle of 0.040 to 0.065 inch, and a maximum thickness at the edges of about 0.075 inch, with the radius of the concave spherical contacting surface being 3 to 5 inches and the material of the contact wall having a modulus of elasticity between 3.5 to $6.5 \times 10^5$ p. s. i. (pounds per square inch) per increment of unit deformation.

By way of another example, the contact wall of the foregoing shape may be provided with a groove formed along its periphery, as indicated schematically at 32 in Fig. 1, with the thickness of the contact wall at its central region being about 0.025 to .040 inch and the material thereof having a modulus of elasticity of 8 to $16 \times 10^5$ p. s. i. per increment of unit deformation By way of a further example, in the practical form of the receiver shown in Figs. 4 to 6 and 10, the contact wall 43 was 0.980 inch long, 0.670 inch wide; its thickness at the center region was 0.40 inch and the thickness at the edges was 0.070 inch. The corresponding dimensions of the other parts of the receiver shown in Figs. 4 to 6 and 10 indicate the other dimensions of the casing 40 of the receiver, the maximum height of which, without the contact wall, was 0.410 inch.

Figure 6A:
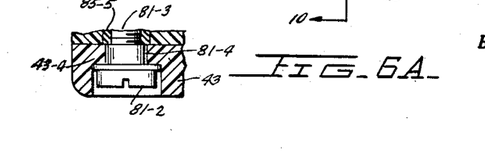
Fig. 6a is a fragmentary detailed view of a modification of the structure of Fig. 6.

Each of the opposite border regions of the contact wall 42 may be attached to the open bottom face of the casing side walls 43 by shoulder screws 81–2 of the type shown in Fig. 6-A. The shoulder screws 81–2 has between its threaded shank 81–3 and its head a shoulder portion 81–4 of a height substantially equal to the thickness of the recessed wall portion 43–4 of the contact wall 43 held clamped by the screw head. A circular washer 81–4 of yieldable material, for instance, such as polyethylene or like plastic, is shown interposed between the head of the fastening screw 81–2 and the recessed wall portion 43–4 of the contact wall clamped by the screw head to the bottom face of the casing side walls 42.

The response of receivers of the invention may be easily controlled. The first or lowermost resonance region 17–1 of the response is determined by the interaction of the compliance C–1 and the masses L–1 of the receiver in relation to the other parts thereof as indicated by the correspondingly marked elements of the receiver shown in Fig. 1. By choosing the dimensions and the elastic properties of the material of these elements in relation to the other elements of the receiver, the first resonance region 17–1 may be thus readily determined.

In a similar manner, the resonance region 17–2 of the response curve of such receiver is determined by the interaction of the compliance C–1 and the mass L–1 of the receiver (as indicated by the correspondingly marked elements of Fig. 1) in their relation to the compliance C–2 of the flesh of the head and the other parts of the receiver when the contact wall 43 is held coupled to the hearing inducing bones of the head.

In other words, the first resonance region 17–1 and the second resonance region 17–2 of the response curve of the receiver are determined by the fundamental modes of the receiver elements forming the first two meshes of the network shown in Fig. 2–A, when C–5 considered as being of zero value, and R–7 and L–6 as being infinite. In a similar manner, the third resonance region 17–3 of the response curve 17 is determined by the fundamental mode of the receiver elements which form mesh C–5 and L–6 of the network shown in Fig. 2–A. Thus, the thinner the contact wall 43 is made, the lower will be the frequency of the resonant region 17–3 of receiver response. These resonance regions of the response curves may thus be controlled by choice of the dimensions of these receiver elements and the elastic properties of the material out of which they are made.

In order to bring out the practical significance of the invention, and also in order to enable more ready practice thereof but without thereby in any way limiting its scope, there will be now given constructional data of one practical form of a bone conduction receiver of the invention, of the construction shown in Figs. 4, 5 and 6 to 10.

The lateral dimensions of the oblong casing 41 as seen in Fig. 5 are: maximum length .980 inch; maximum width .670 inch; and maximum height (without contact wall 43) .410 inch. The contact casing wall 43 of the receiver is .40 inch thick at the thinnest center region and has at its edge a maximum thickness of .070 inch. The dimensions of the other parts shown are correspondingly smaller.

Figure 4A:
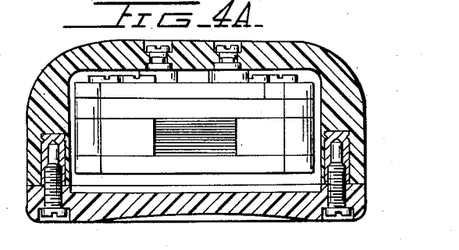
Figure 5A:
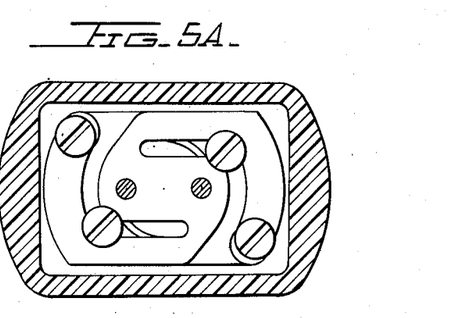

The total weight of the electromagnetic core assembly excluding the armature 52 is about 5.5 grams and the weight of the entire casing including armature 52 about 3½ grams, giving the total receiver weight of 9 grams. In contrast, the smallest and best prior art bone conduction receiver of generally similar construction—but without the features of invention brought out above—and shown in Figs. 4–A and 5–A—had a total weight of 16.8 grams consisting of the electromagnetic assembly weighing 9.3 grams and the housing weighing 7½ grams.

The casing contact wall 42 of the desired operating characteristics of the invention may be made of a plastic material which has a modulus of elasticity of 3 to $6 \times 10^5$ pounds per square inch and up to about $7 \times 10^5$ pounds per square inch. If a plastic material having a modulus elasticity of $8 \times 10^5$ pounds per square inch is used, the thickness of the contact wall 42 has to be correspondingly reduced. The following commercially available moldable plastic materials having a modulus elasticity of 4 to $6 \times 10^5$ pounds per square inch have been found to be satisfactory for such casing contact walls 43 of the invention: polystyrene, methyl methacrylate. Nylon (or polyamide) is also available with a modulus of elasticity of 4 to $6 \times 10^5$ pounds per square inch for such contact walls but this material has more internal resistance due to internal energy dissipation, thereby reducing somewhat the response in the high frequency regions.

In the band pass filter analog of Fig. 2–A, the different circuit elements represent the different elements of the receiver of the invention shown in Figs. 4, 5 and 6 to 10 in the manner explained above in connection with the diagrammatic view of such receiver shown in Fig. 1.

By way of example, the bone conduction receiver of the invention described above in connection with Figs. 4, 5 and 6 to 10, and designed for operation in accordance with the analog of Fig. 2–A will be represented in this diagram by elements having the following constants:

The resiliently carried core 60 represents a mass of L–5 of 5 grams;

The compliant armature arms 53 represent a compliance C–1 of $1.4 \times 10^{-8}$ centimeter/dyne;

The mass of the armature 51 represents a mass L–3 of ½ gram;

The casing rear wall 41 and casing side walls 42 represent masses L–4 and L–5 of ½ gram and 1 gram, respectively; and The contact wall portion 42 represents a mass L–6 of about ¼ to ½ grams.

In general, effective bone conduction receivers may have a resiliently carried mass L–5 of at most about 7 grams and an overall mass of at most 12 grams.

Bone conduction receivers of the invention of the type described in connection with Figs. 4, 5, 6 to 10 having the contact wall 43 attached to the casing side walls 42 with conventional flat head screws 81 as shown in Fig. 6 may be manufactured on a production basis to operate with the desired operating characteristics represented by the solid line response curve 17 of Figs. 3–A and 3–B with only minor variations in the response level above 2000 C. P. S.

The response of the receiver of the invention may be further controlled in the upper part of the frequency range by choice of the thickness and the material of mounting wall region 41–4 of the receiver casing which links the central mounting wall 41 to the surrounding rigid casing walls 42. Thus, as shown by the response curves of Fig. 3–B, the solid line response curve 17 of such receiver may be raised in the upper part of the frequency range to the level indicated by dash line curve 18, by making the peripheral rear wall link elements 41–4 somewhat thinner. In a similar way, the high frequency response level may be lowered by making the rear wall link elements 41–4 somewhat thicker. Fig. 2–B is a band-pass filter analog of a so modified receiver. In this analog, the mass L–5 of the side walls 42 of the receiver casing and the compliance C–4 of the thin wall region 41–4 of the mounting wall 41 of the receiver casing form a distinct filter mesh.

In other words, the thick central mounting portion of the casing rear wall 41 may be designed so that it is joined through somewhat thinner wall link elements 41–4 to the relatively highly rigid casing side wall structure 29 of the casing 40 and provide an additional vibratory mode in the part of the frequency range above 6000 C. P. S. while retaining all desirable operating characteristics of the receiver secured by the provision of the contact wall which vibrates relatively to the hollow receiver casing with a vibratory mode of 2500 to 5000 C. P. S. or in general, up to 6000 C. P. S.

In order to utilize the bone conduction receivers of the invention in a most effective manner, they are combined with hearing aid amplifiers designed to roll off or cut the response in the frequency range beyond the fundamental mode of the contact wall. In Fig. 3–B, curve 19 is representative of the frequency response of such hearing aid amplifier which provides full amplification over the frequency range up to about 5000 C. P. S., the response rolling off and dropping sharply above 6000 C. P. S. Such amplifier high-frequency cut-off is very desirable, because it cuts off and suppresses disturbing harmonic and intermodulation distortion components in the frequency region which a defective receiver might transmit to the hearing organs of the user, but which should not be transmitted to him.

Figure 13:
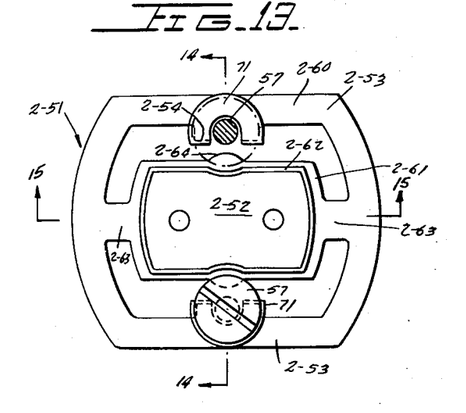
Fig. 13 is a modification of the armature structure shown in Figs. 7 to 11, inclusive.
Figure 14:
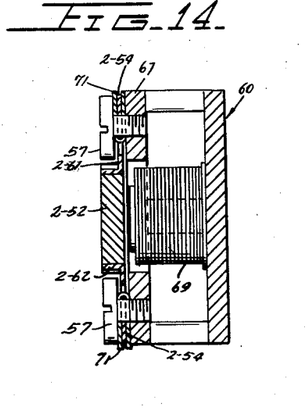
Fig. 14 is a cross-section taken along line 14—14 of Fig. 13.
Figure 15:
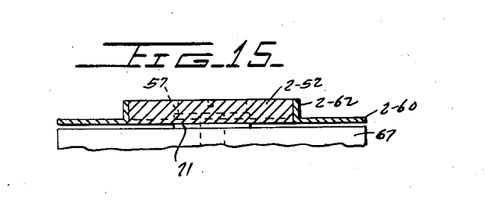
Fig. 15 is a detailed view of a portion of of Fig. 14.

Figs. 13 to 15 show a modified form of armature structure 2–51 for an electromagnetic transducer device of the invention of the type described in connection with Figs. 1 to 12. The armature structure comprises a generally central flat magnetic armature 2–52 generally similar to the main armature member 52 of Fig. 11. The armature 2–52 is shown joined to the pole plate 67 of the resiliently carried core structure 60 by a resilient junction spring structure 2–60 of highly effective thinner spring sheet metal, such as berylium copper. The junction spring structure 2–6 is shown in the form of a frame surrounding and affixed to the armature 2–52 and overlying the similarly shaped pole plate 67 of the core structure 60.

In the form shown, the junction structure 2–60 comprises an inner frame member 2–61 surrounding and affixed to the periphery of the oblong thicker armature 2–52 and two resilient junction arms 2–52 extending from common opposite inner frame portions 2–63 of the inner frame member 2–61. The inner frame member 2–61 is formed with an angularly turned rim 2–62 fitting and secured to the peripheral border of the armature 2–52, as by welding or soldering.

In the form shown, each of the two resilient junction arms 2–53 form opposite half sections of a continuous outer frame member surrounding the inner frame member 2–61. Opposite portions thereof of the frame-like junction arms 2–53 are joined to the inner frame member 2–61 by a set of opposite common junction portions 2–63 lying adjacent to the center of the opposite shorter border sides of the oblong armature 2–52. The intermediate portion of each of the two resilient junction arms 2–53 is arranged and shaped to serve as a junction arm portion thereof 2–54 shaped similar to the junction arm portion 54 of the armature structure of Fig. 11.

The junction arm portion 2–53 of the junction structure of Figs. 13 and 14 has placed thereover the overlapping arms of a shim spacer structure 71 similar to that or described in connection with Figs. 7–11 and they are similarly clamped to the underlying core pole plate 67 by the heads of junction screws 57.

The opposite central portions of the inner frame member 2–61 of the resilient junction structure 2–51 are provided with the lateral stop projections 2–64 which underly the peripheral stop region of the head of the clamping screw 57 which is arranged to stop vibratory excursions of the core structure 60 relatively to the armature 2–52 beyond the limit of the stop spacing as determined by the thickness of the spacer arms of the shim structure.

Both armature structures of the invention shown and explained in connection with Figs. 7 to 11 and Figs. 13–15 are of the beam type, in that each of these armatures has two oppositely extending junction arms joined with their two junction ends to the cooperating core structure for controlling the vibratory movement therebetween. Electromagnetic vibratory transducer devices of the invention may be also designed for operation with armatures of the cantilever type which are joined to the cooperating core structure through only one resilient junction arm.

Figure 16:
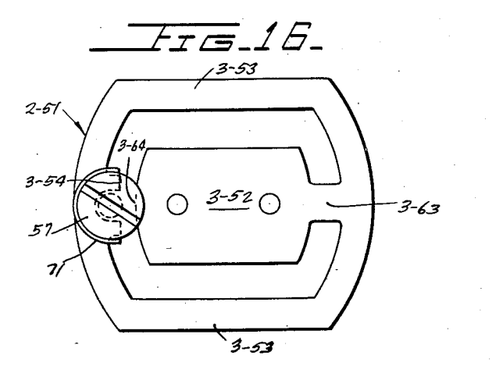
Fig. 16 is a further modification of the armature structure shown in Figs. 7 to 11, inclusive.

Fig. 16 shows a cantilever type armature, generally designated 3–51 designed for cooperation with a core structure 60 of a device of the invention such as described in connection with Figs. 1–12. The armature structure 2–51 comprises a generally central flat magnetic armature 3–52 generally similar to the main armature member 52 of Fig. 11. The armature 3–52 is joined to the pole plate 67 of the core structure 60 by only one arm 3–53 extending from one border region 3–63 of the armature 2–52 and provided with an armature junction portion 3–54 located adjacent the opposite stop border portion 3–64 of the armature 3–52. In the form shown, the armature arm 2–53 forms a continuous loop structure shaped like a frame surrounding the inner centrally disposed magnetic armature 3–52. The junction arm portion 3–54 of the loop-like junction arm 3–53 is shaped similar with the junction arm portion 54 of the armature structure of Fig. 11 and has placed thereover the overlapping arms of a U-shaped shim spacer structure 71 similar to that described in connection with Figs. 7–11. The junction arm portion 2–54 of the armature 2–51 of Fig. 16 is affixed to the underlying portion of the pole plate 67 by the head of a screw 57 holding clamped thereunder the armature junction arm portion 3–54 with the two overlapping arms of the shim spacer 71 in a manner similar to that described in connection with Figs. 7–11. The peripheral region of head of screw 57 is arranged to overlie and serve as a stop for a stop border portion 3–64 of the underlying armature 3–52 thereby limiting the vibratory excursions of the core 60 relatively to the armature to the stop spacing determined by the thickness of a spacer arm of shim structure 71.

In a co-pending application Serial No. 299,474, filed July 17, 1952, now Patent No. 2,804,509, there are claimed the features of the invention disclosed herein and directed to an inertia reaction bone conduction receiver or like electroacoustic transducer device having an internal electromagnetic transducer structure with one resilient magnetic core member arranged to vibrate relatively to the other core member across a narrow gap spacing, which other core member has one resilient core arm extending from a first border region thereof to an end portion positioned adjacent a second border region thereof, and also having an internal integral securing structure such as a screw, with a mounting portion affixed to the one core member resiliently carried in the casing, and a holding portion such as a screw head thereof for fixing the core end of the other core member to the one core member, and an integral part of the holder portion of the securing structure overlying the core arm and constituting a stop structure overlying the adjacent border region thereof for limiting the vibratory excursion of the resiliently carried one core member within the casing.

The features and principles underlying the invention described above in connection wtih specific exemplifications, will suggest to those skilled in the art many other modifications thereof. It is accordingly desired that the appended claims shall not be limited to any specific features or details shown and described in connection with the exemplifications thereof.

I claim:

1. In an inertia reaction bone conduction receiver or like electro acoustic transducing device having an electromechanical transducer structure responsive to impressed electrical and acoustical oscillations over the principal speech frequency range comprising (1) an open-end casing and (2) a transducer mounted on an inner wall of said casing, a body contact wall closing off said open-end casing and attached thereto in substantially independent vibrating relationship through resilient means, said body contact wall having its own resonant frequency in a range between about 2000 to 6000 cycles per second whereby said transducing device will operate essentially as a mechanical band-pass filter and have an attenuated response above said resonant frequency when said contact wall is held in contact with a body.

2. In an inertia reaction bone conduction receiver or like electro acoustic transducing device having an electromechanical transducer structure responsive to impressed electrical and acoustical oscillations over the principal speech frequency range comprising (1) an open-end casing and (2) a transducer resiliently mounted on an inner wall of said casing, a body contact wall closing off said open-end casing and attached thereto in substantially independent vibrating relationship through resilient means, said body contact wall having its own resonant frequency in a range between about 2000 to 6000 cycles per second and said transducer structure having a resonant frequency in a range between about 300 to 700 cycles per second when said casing is restrained against motion, whereby said transducing device will operate essentially as a mechanical band-pass filter and have an attenuated response above said resonant frequency when said contact wall is held in contact with a body.

3. In an inertia reaction bone conduction receiver or like electro acoustic transducing device having an electromechanical transducer structure responsive to impressed electrical and acoustical oscillations over the principal speech frequency range comprising (1) an open-end casing having a back wall and side walls and (2) an electromagnetic transducer positioned within said casing having an outer magnetic vibratory portion mounted to the back wall of said casing and an inner electromagnetic vibratory portion resiliently carried on said outer vibratory portion, a body contact wall closing off said open-end casing and attached thereto in substantially independent vibrating relationship through resilient plate-like elements, said body contact wall having its own resonant frequency in a range between about 2000 to 6000 cycles per second and said transducer structure having a resonant frequency in a range between about 300 to 700 cycles per second when said casing is restrained against motion, whereby said transducing device will operate essentially as a mechanical band-pass filter and have an attentuated response above said resonant frequency when said contact wall is coupled to an artificial mastoid the compliance of which is of the order of ½ to 2 times $10^{-8}$ centimeter per dyne.

4. In a device as claimed in claim 1, said body contact wall being attached to said open end casing through resilient means at only one pair of opposite edge portions of said wall.

5. In a device as claimed in claim 1, said open end casing being of oblong shape at the open end thereof and said body contact wall attached to said casing through resilient means at only the opposite shorter edge portions of the open end of said casing.

6. In a device as claimed in claim 5, the overall mass of said device being at most about 12 grams, the mass of said transducer being at most about 7 grams and said body contact wall formed of a material having a modulus of elasticity of at most 16 times $10^5$ pounds per square inch per increment of unit deformation.

7. In a device as claimed in claim 2, said open end casing being of oblong shape at the open end thereof, said body contact wall being attached to said casing through resilient means at only one pair of opposite shorter edge portions of said open end, the overall mass of said device being at most about 12 grams, said body contact wall being formed of a material having a modulus of elasticity of at most 16 times $10^5$ pounds per square inch per increment of unit deformation and having a mass of at most about 1 gram, the mass of said transducer being at most about 7 grams.

8. In a device as claimed in claim 3, said body contact wall being attached to said open end casing at only one pair of opposite edge portions of said wall.

9. In a device as claimed in claim 8, the overall mass of said device being at most about 12 grams, the mass of said inner electromagnetic vibratory portion being at most about 7 grams, said body contact wall being formed of a material having a modulus of elasticity of at most 16 times $10^5$ pounds per square inch per increment of unit deformation.

References Cited in the file of this patent

UNITED STATES PATENTS

| | | |
|---|---|---|
| 2,202,906 | Hawley | June 4, 1940 |
| 2,441,975 | Roberton | May 25, 1948 |
| 2,463,786 | Lybarger | Mar. 8, 1949 |
| 2,500,541 | Greibach | Mar. 14, 1950 |
| 2,680,157 | Wolff | June 1, 1954 |